United States Patent
Drexler et al.

(10) Patent No.: US 12,142,153 B2
(45) Date of Patent: Nov. 12, 2024

(54) VEHICLE MOTION CONTROLLER VIA OFF-AXIS BEAM MEASUREMENT

(71) Applicant: United States of America as represented by the Secretary of the Navy, San Diego, CA (US)

(72) Inventors: Kyle Robert Drexler, San Diego, CA (US); Stephen Hammel, Lakeside, CA (US); John Stephen deGrassie, San Diego, CA (US); Benjamin Joel Laxton, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 218 days.

(21) Appl. No.: 18/087,503

(22) Filed: Dec. 22, 2022

(65) Prior Publication Data

US 2024/0212514 A1 Jun. 27, 2024

(51) Int. Cl.
*G08G 5/00* (2006.01)
*G06V 20/17* (2022.01)

(52) U.S. Cl.
CPC .......... *G08G 5/0069* (2013.01); *G06V 20/17* (2022.01); *G08G 5/0091* (2013.01)

(58) Field of Classification Search
CPC ..... G08G 5/0069; G08G 5/0091; G06V 20/17
See application file for complete search history.

(56) References Cited

U.S. PATENT DOCUMENTS

| | | |
|---|---|---|
| 3,255,984 A | 6/1966 | Hawes |
| 7,719,664 B1 | 5/2010 | Flowers |
| 2015/0317597 A1 | 11/2015 | Shucker |

*Primary Examiner* — Mathew Franklin Gordon
(74) *Attorney, Agent, or Firm* — Naval Information Warfare Center, Pacific; Kyle Eppele; J. Eric Anderson

(57) ABSTRACT

A light-guided vehicle comprising: a platform; an optical sensor mounted to the platform, wherein the optical sensor is configured to image off-axis scatter of a photon beam; a processing unit mounted to the platform, wherein the processing unit is communicatively coupled to the platform and to the optical sensor, and wherein the processing unit is configured to monitor intensities of off-axis photons that are scattered by aerosol particles in a beam propagation path as measured by the optical sensor, and wherein the processing unit is further configured to maintain the platform within a vehicle path based on the monitored off-axis-photon intensities, wherein the vehicle path is offset from, and parallel to, the propagation path.

20 Claims, 6 Drawing Sheets

30

Propagate a photon beam through a medium along a beam propagation path. — *30a*

Monitor, with a vehicle-mounted sensor, intensities of off-axis photons that are scattered by aerosol particles in the beam propagation path. — *30b*

Maintain the vehicle within a vehicle path based on monitored off-axis-photon intensities. — *30c*

*Fig. 2*

VEHICLE MOTION CONTROLLER VIA OFF-AXIS BEAM MEASUREMENT

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; NIWC_Pacific_T2@us.navy.mil. Reference Navy Case Number 112881.

BACKGROUND OF THE INVENTION

This invention relates to remotely-operated and autonomous vehicles and methods for guiding the same. It is desirable to be able to remotely-operate a vehicle or have a vehicle autonomously navigate without the need of satellite navigation systems or tomographic data.

SUMMARY

Disclosed herein is a light-guided vehicle and a method of controlling the vehicle. The light-guided vehicle comprises a platform, an optical sensor, and a processing unit. The optical sensor is mounted to the vehicle and is configured to image off-axis scatter of a photon beam propagating within a medium. The processing unit is mounted to the platform and communicatively coupled to the platform and to the optical sensor. The processing unit is configured to monitor intensities of off-axis photons that are scattered by aerosol particles in a beam propagation path as measured by the optical sensor. The processing unit is further configured to maintain the platform within a vehicle path based on the monitored off-axis-photon intensities. The vehicle path is offset from, and parallel to, the propagation path. The method of controlling the vehicle comprises the following steps. The first step provides for propagating the photon beam along the beam propagation path through the medium. The next step provides for monitoring, with the optical sensor, intensities of off-axis photons that are scattered by aerosol particles in the beam propagation path. The next step provides for maintaining the vehicle within the vehicle path based on the monitored off-axis-photon intensities.

BRIEF DESCRIPTION OF THE DRAWINGS

Throughout the several views, like elements are referenced using like references. The elements in the figures are not drawn to scale and some dimensions are exaggerated for clarity.

FIG. 2 is a flowchart.

DETAILED DESCRIPTION OF EMBODIMENTS

The disclosed vehicle and vehicle control method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1A:
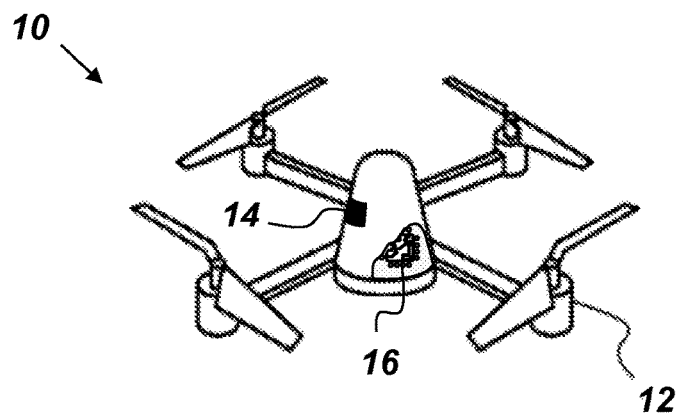
FIG. 1A is a perspective view of an embodiment of a light-guided vehicle.
Figure 1B:
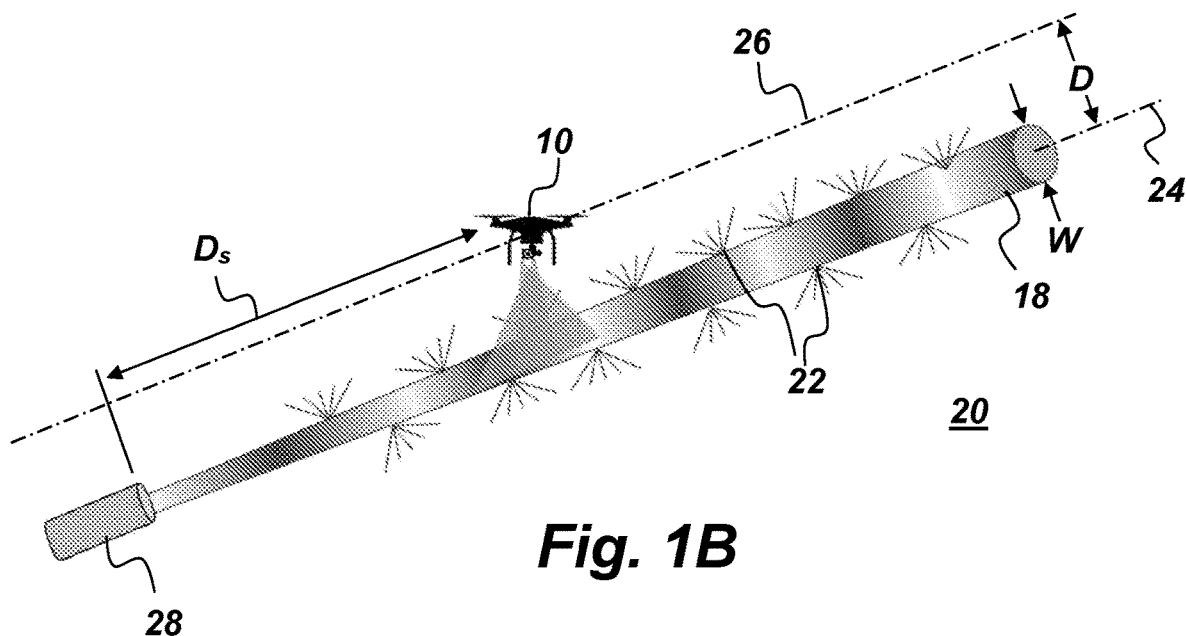
FIG. 1B is a side view of an embodiment of a light-guided vehicle interacting with a photon beam.

FIG. 1A is a perspective view of an embodiment of a light-guided vehicle 10 that comprises, consists of, or consists essentially of a platform 12, an optical sensor 14, and a processing unit 16. FIG. 1B is an illustration of an embodiment of the light-guided vehicle 10 interacting with a photon beam 18. The optical sensor 14 is mounted to the platform 12 and is configured to image off-axis scatter of the photon beam 18 that is propagating through a medium 20. The processing unit 16 is mounted to the platform 12 and is communicatively coupled to the platform 12 and to the optical sensor 14. The processing unit 16 is configured to monitor intensities of off-axis photons as measured by the optical sensor 14 that are scattered by particles 22 suspended in the medium 20 in a beam propagation path 24 (also referred to herein as the light or laser axis). The processing unit 16 is further configured to maintain the platform 12 within a vehicle path 26 based on the monitored off-axis-photon intensities. The vehicle path 26 is offset from, and parallel to, the beam propagation path 24. This light-guided vehicle 10 may be configured to primarily utilize the off-axis photons that are scattered from the beam propagation path 24 to ensure that the light-guided vehicle 10 remains at a controlled offset distance D from the photon beam 18.

FIG. 2 is a flowchart of a beam-guidance method 30 that comprises, consists of, or consists essentially of the following steps. The first step $30_a$ provides for propagating a photon beam along a beam propagation path through a medium. The next step $30_b$ provides for monitoring, with a vehicle-mounted sensor, intensities of off-axis photons that are scattered by aerosol particles in the beam propagation path. The next step $30_c$ provides for maintaining the vehicle within a vehicle path based on monitored off-axis-photon intensities.

The platform 12 may be any platform capable of locomotion. Suitable examples of the platform 12 include, but are not limited to, an aerial vehicle, an underwater vehicle, a space craft, and a land-surface vehicle. The platform 12 may be manned or unmanned. In the embodiments of the platform 12 shown in FIGS. 1A and 1B, the platform 12 is an unmanned quadcopter. The optical sensor 14 may be any imaging sensor capable of measuring off-axis scatter effects from a light that is propagating through the medium 20. Suitable examples of the optical sensor 14 include, but are not limited to, a single sensor and a stereoscopic sensor (i.e., two or more sensors). The main technical tradeoff between the stereoscopic techniques is size, weight and power at an accuracy cost, where the stereoscopic version will require more sensors, which will increase the size, weight, and power consumption of the system over a single sensor, but will result in a sensor system that is more accurate. The optical sensor 14 may be configured to match the type of light in the photon beam 18. For example, if the light is in the visible spectrum, a simple charge-coupled device (CCD) sensor such as the Grasshopper sensor or the Blackfly sensor, both manufactured by Teledyne FLTR LLC, would be suitable. If the light is in a different band, such as long wave infrared (LWIR), a thermal camera such as FLIR's BOSON uncooled, longwave infrared thermal camera module may be used as the optical sensor 14. The processing unit 16 may be any onboard computer or logic circuit capable of inputting and outputting numerical computations. Suitable examples of the processing unit 16 include, but are not limited to, a central processing unit (such as manufactured by Intel or AMD), a field programmable gate array (FPGA), and an application-specific integrated circuit (ASIC).

The photon beam 18 may be any coherent or incoherent light beam. A suitable example of the photon beam is, but is not limited to, a laser beam such as may be generated by a hand-held laser pointer or such as a high energy laser (HEL). Suitable examples of the medium 20 include, but are not limited to gas (e.g., air), liquid (e.g., water), and space. However, method 30 may be less effective in space due to the reduced amount of particles 22 available to create measurable off-axis scattering of the photon beam 18. The vehicle path 26 may be a single line such as shown in FIG. 1B. An alternative embodiment of the vehicle path 26 may be an annular cylinder surrounding the photon beam 18. The amount of offset of the vehicle path 26 from the propagation path 24 may be predefined depending on the needs of a particular mission. As a non-limiting example, if an HEL is used for the photon beam, it may be desirable to set the offset distance D to two meters.

In one example application, the light-guided vehicle 10 and method 30 may be used to perform measurements of atmospheric conditions along the beam propagation path 24. In this embodiment, an unmanned aerial drone may be outfitted with atmospheric/meteorological sensors and used as the platform 12 with the goal of enabling volumetric measurement of the atmosphere close to the photon beam 18. The light-guided vehicle 10 and method 30 may operate independent of mapping or tomographic data, relying only on the off-axis scatter information to maintain its correct position and course. The light-guided vehicle 10 and method 30 also do not need to interface with the source 28 of the photon beam 18 to operate. Measurements of atmospheric conditions may be performed at prescribed distances from the source 28 of the photon beam 18. The light-guided vehicle 10 may function as a reusable substitute for balloon-lifted radiosondes such as rawinsondes that are often not recoverable/reusable. The photon beam 18 may be pointed in any desired direction and the light-guided vehicle 10 may be configured to hover at a predetermined altitude. This may be done by adding an altimeter to the light-guided vehicle or by having the light-guided vehicle maintain a prescribed distance $D_s$ from the source 28 by measuring a beam waist W and maintaining the vehicle at a distance $D_s$ associated with a predefined beam waist measurement.

An accelerometer and/or a gyroscope may optionally be mounted to the light-guided vehicle 10 for additional positional accuracy. As the photon beam 18 propagates away from the source 28, its beam waist W will change depending on the focus of the photon beam 18. The light-guided vehicle 10 may be configured to operate in one of three modes: a) move along the vehicle path 26 until a predefined beam waist W is measured; b) return to an origin point; and c) station-keep at a given location along the vehicle path 26 corresponding to a given beam waist measurement.

In operation of one embodiment, the light-guided vehicle 10 may be launched vertically at a static offset from the photon beam 18. After launch, the optical sensor 14 may take calibration data to measure the off-axis scattered light, while the light-guided vehicle 10 moves in a spiral pattern to gather additional calibration data that relates to distance traveled and light intensity received. Once the calibration routine is done, the light-guided vehicle 10 may then begin its movement relative to the photon beam 18 in the desired pathing mode. The positional information may be derived utilizing standard proportional-integral-derivative controller (PID) mechanics.

Light, whether coherent or incoherent, will scatter off of the particles 22 (e.g., molecules and aerosols) that are present in the propagation path 24 in the medium 20 through which the light propagates. The scattering results in a portion of the total propagated photons to be redirected from the forward propagation direction axis (i.e., the beam propagation path 24) and into off-axis directions. The phenomenon of light scattering is well-described by the fundamental physics descriptions of Electromagnetism and Radiative Transfer. For example, if the medium 20 is air, the proportion and angular distribution of the scattered photons can be calculated, provided that the volume distribution and types of molecules and aerosols is known.

Figure 3A:
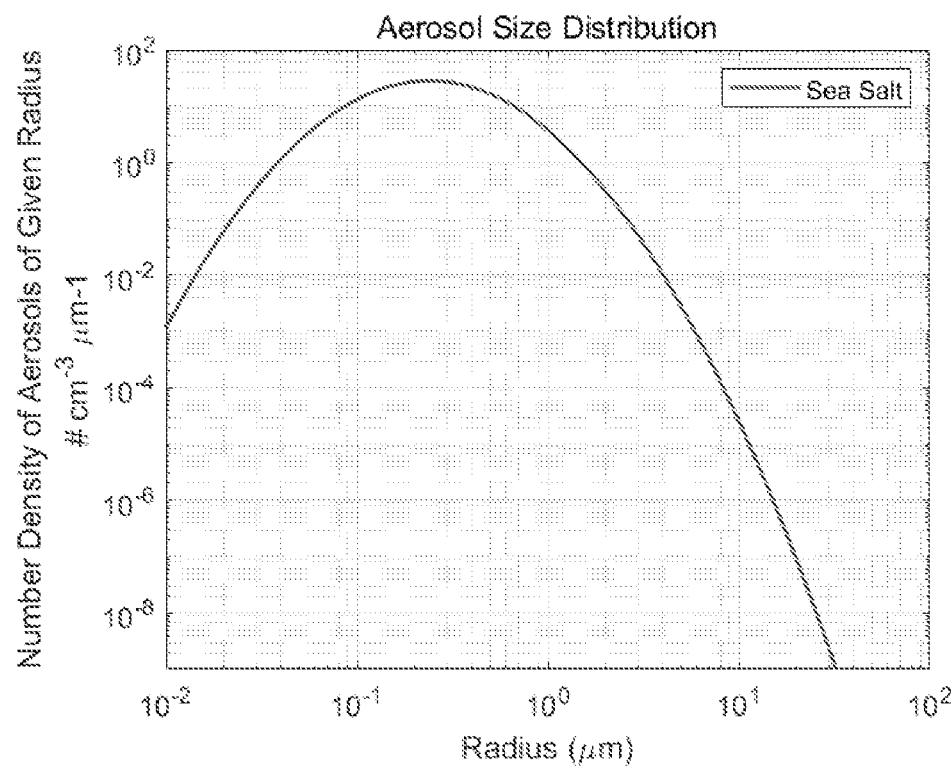
FIGS. 3A and 3B are plots of data.
Figure 3B:
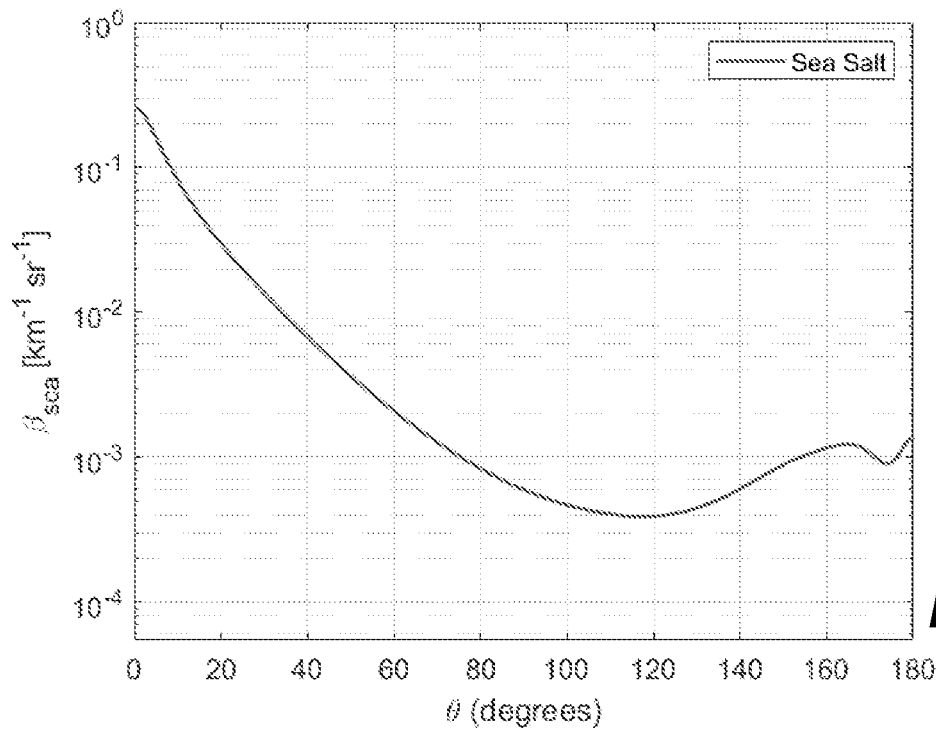

FIG. 3A is a plot of an example aerosol size distribution. FIG. 3B is an example intensity distribution function plot for a photon to scatter into one steradian (sr) of a given direction, θ. The example plots in FIGS. 3A and 3B are for 1064 nanometer light scattering off of a size distribution of particles 22, which in this case are salt-water aerosols. For the data represented in FIGS. 3A and 3B, the following assumptions were made:

The medium 20 is air;
Each salt-water aerosol is a sphere with radius, R, and index of refraction of $n=1.37-7.19\times10^{-5}$.
A direction of θ=0 is the forward direction of propagation, a direction of θ=90 is orthogonal to the forward direction, and a direction of θ=180 is antiparallel or in the backward direction of propagation.

By measuring the scattered intensity $\beta_{sca}$ the scattered intensity over a range of angles (θs), the processing unit 16 will calculate the position of the platform 12 relative to the forward direction of the propagating light in the photon beam 18. With the information gathering in the calibration phase the processing unit 16 may determine the correct direction to continue moving to keep bearing with the propagating light in the photon beam 18.

Atmospheric measurements that are taken at a single point in time and space are referred to as nodal measurements. These types of measurements include air temperature, pressure, humidity, wind speed, wind direction, and ground temperature at a given point. These types of measurements are necessary to accurately characterize the atmosphere and to validate weather prediction models. Traditionally, these types of measurements rely on a combination of static ground based stations and vertical radiosonde launches. The light-guided vehicle 10 is not limited both vertically and geographically to a single point like a ground station, but is instead able to repeatedly collect a series of data at multiple locations along the vehicle path 26. The propagation path 24 may be controlled to ensure that the corresponding vehicle path 26 stays within a region of interest and that the light-guided vehicle 10 is not blown off course as is typical with radiosonde balloons. Method 30 and the light-guided vehicle 10 enable the taking of measurements that are directly along geometries of interest for testing purposes. The light-guided vehicle 10 may be configured to navigate based solely on monitored off-axis-photon intensities independent of mapping or tomographic data or additional navigational aids may be included, such as global positioning system (GPS) sensors, etc. That said, there may be some embodiments of the light-guided vehicle 10 where it may also be desirable to include satellite navigation sensors/equipment on the platform 12. The light-guided vehicle 10 may be configured to return to a point of origin when the beam waist W drops below or above a threshold value.

Figure 4A:
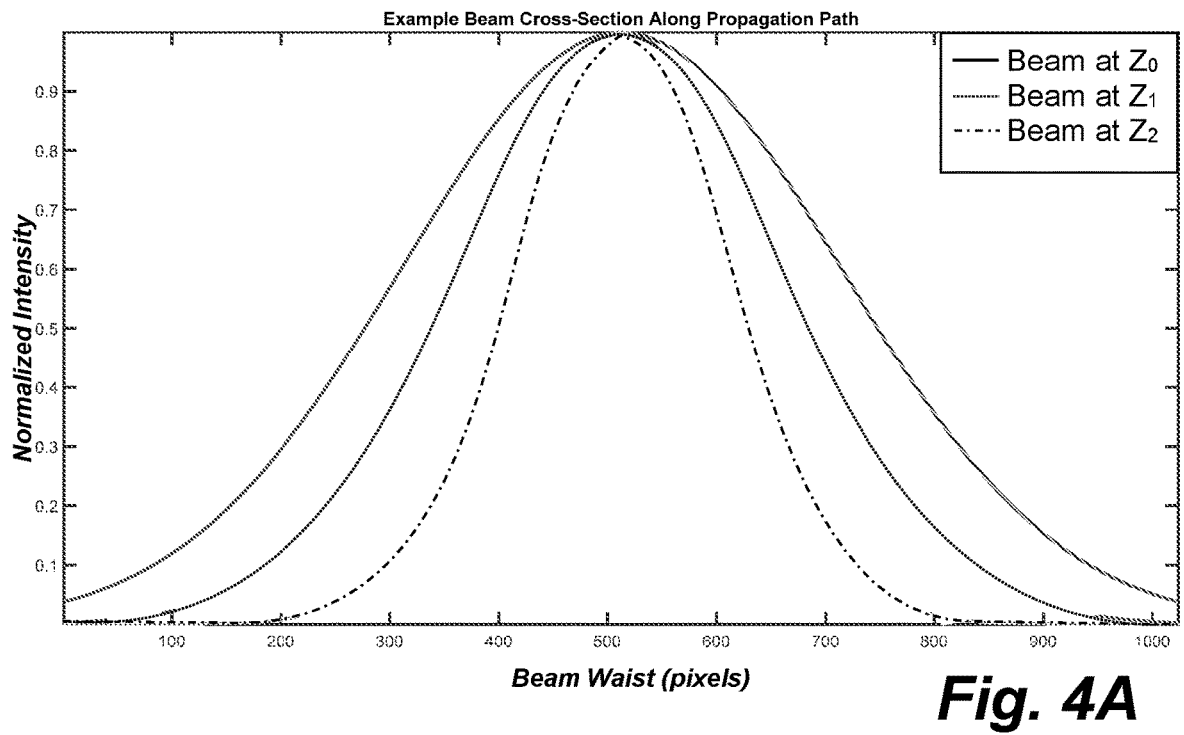
FIGS. 4A and 4B are plots of data.

FIG. 4A is a plot of example beam waist measurements (measured in pixels) of the photon beam 18 along the propagation path 24 through air. The beam waist measurement, or cross section, of the imaged beam will change along the propagation path. The beam waist measurement may be determined by system parameters and atmospheric conditions. The primary factor will be the focusing term that is applied to the beam. For the following discussion, we will assume the light-guided vehicle 10 and method 30 are being used in conjunction with an HEL in a focusing configuration, but this could as easily be applied to other optical systems that are not being focused. As the photon beam 18 propagates, the beam will become tighter and more focused along the propagation path 24, resulting in a decreasing beam waist W along the propagation path 24 until a focal point is reached. This is shown in FIG. 4 where Z indicates some arbitrary distance from the source 28 of the HEL. The light-guided vehicle 10 may continually keep measuring the beam waist W and at some point, as determined in the system parameters, when the beam becomes "too" narrow, the drone may be configured to reverse course and return to the origin point. Additionally it should be noted that the raw image itself will likely be some form of a trapezoid, due to the inherent nature of beam propagation and Field-of-View (FOV), with a narrower beam waist on one end and a wider beam waist on the other. A typical embodiment of the photon beam 18 will normally be focused on a focal point, such that from a side view, the overall beam would be appear to be triangular, and a random sampling of the cross section would be fat on one end and narrow on the other. For example, the largest cross sectional area of the beam of an HEL focusing down range will be at the HEL's output aperture, and the narrowest will be at the focal point of the HEL. The trapezoid shape will also enable the vehicle to know which way "home" is for docking back on a host platform without GPS. To keep the distance $D_s$ from the source constant will require continually resampling the received intensity and adjusting the distance from the source 28. This may be complicated due to the inherently changing atmospheric conditions which can result in intensity fluctuations known as scintillation. Adjusting the platform 12's position so as to maintain a constant intensity while accounting for beam divergence may be a primary means for keeping the platform 12 at a constant distance from the photon beam 18. This may be solved for using a PID controller in the processing unit 16.

Figure 4B:
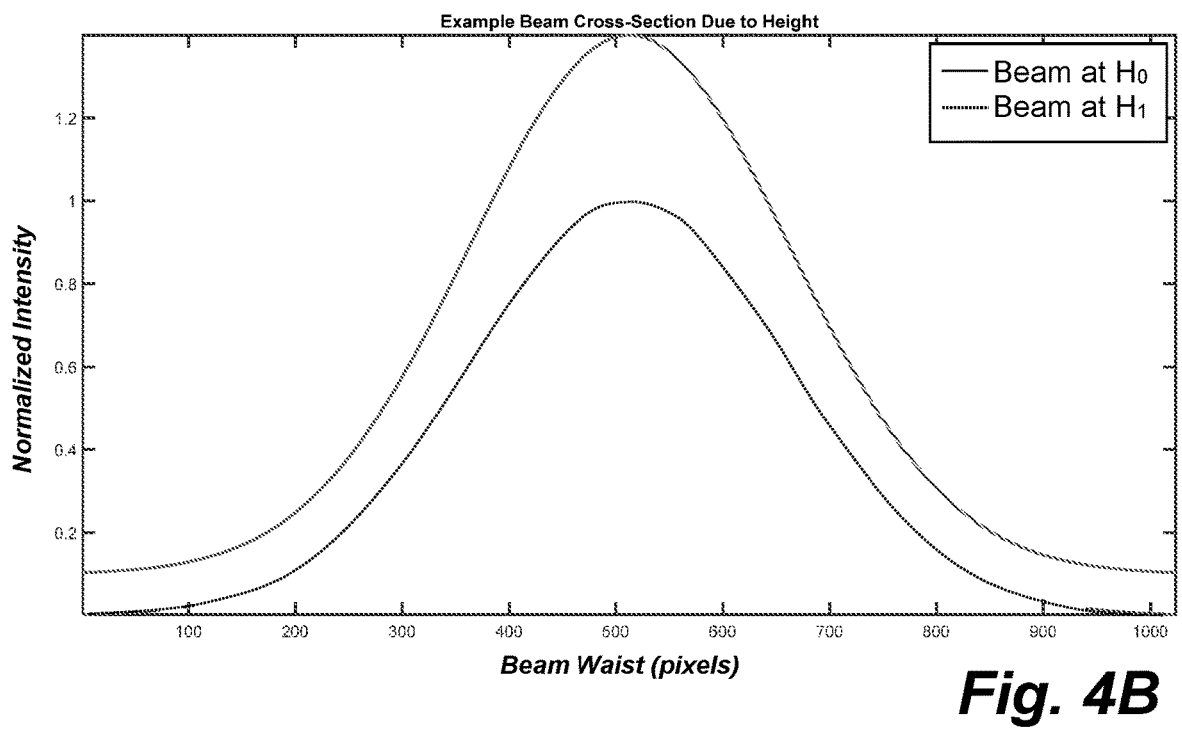

FIG. 4B is a plot of example cross-sectional (i.e. beam waist) data, which shows that at different distances from the source 28, the overall intensity can fluctuate, the intensity value between $H_0$ and $H_1$, along with the beam waist itself. Variations in height will cause beam waist measurement to fluctuate due to the fixed FOV of the imaging system. Using this information enables the distance variable (height in this example) to be solved since the FOV is static and the beam system itself is static, which enables the PID to solve a height correction. If the beam system itself is changing then this could be accounted for given a robust communication system between the light-guided vehicle and the HEL system. The closer the system is to the beam, the more it will fill the FOV.

Figure 5:
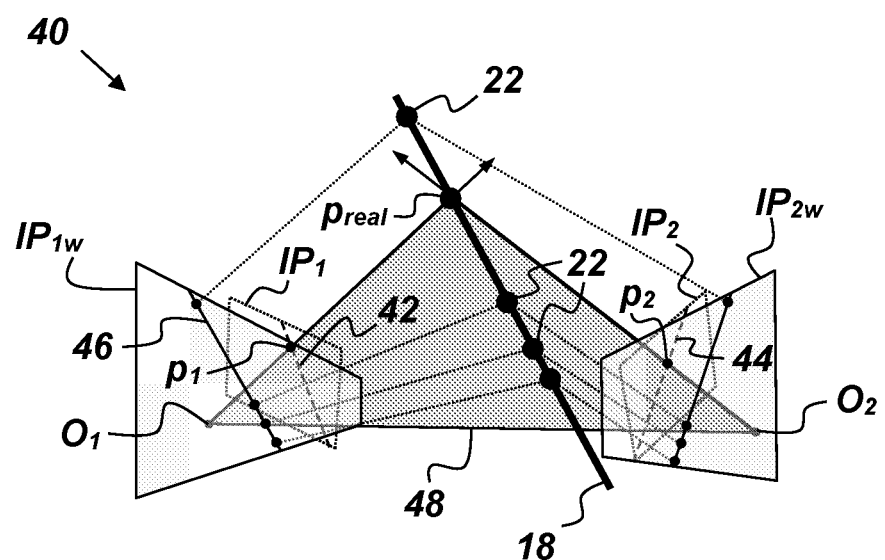
FIG. 5 is an illustration of a three-dimensional triangulation

FIG. 5 is an illustration of a laser embodiment of the photon beam 18 visualized in an epipolar geometric space. The light-guided vehicle 10 can utilize a multi-view machine vision system to triangulate the photon beam in three dimensions (3D) from the side-scattered signal of the beam 18 in the medium 20. FIG. 5 is an illustration of the proposed triangulation using a stereoscopic, two-view, imaging system. In this example embodiment, the optical sensor 14 is a machine vision system comprised of first and second imaging sensors with respective camera centers $O_1$ and $O_2$ and respective first and second virtual image planes $IP_1$ and $IP_2$. The line 48, that is defined by $O_1$ and $O_2$, is the baseline of the stereoscopic system. The dashed lines 42 and 44 respectively illustrated in $IP_1$ and $IP_2$ represent the epipolar lines for each image and are defined by a point in 3D space, $p_{real}$, and the intersection of the baseline 48 with each respective virtual image plane. The epipolar constraint dictates that a point, $p_1$, in $IP_1$ must fall somewhere along the corresponding epipolar line in $IP_2$ and vise-versa. Furthermore, the virtual images $IP_1$ and $IP_2$ may be rectified such that the epipolar lines are parallel to one another and fall along the rows of the corresponding digital images. The process of solving for the epipolar geometry between multiple views and rectifying the image pairs significantly simplifies the correspondence problem for scattered laser energy. An algorithm for point to point correspondence of scatter laser energy and recovery of the 3D laser vector is as follows:

1. Find a beam-center point in a first image (e.g., such as an image in the first image plane $IP_1$, by searching for the pixel $p_1$, which measures the maximum side-scattered energy with a single row of the image.
2. Now, search in the second image plane $IP_2$ for the corresponding point $p_2$ in the side-scattered beam. Since the two images are calibrated and transformed into an epipolar geometric space with respect to each other this search is simplified to finding the maximum side-scattered laser energy in a single row of the second image, where the row is uniquely determined by the epipolar constraint.
3. The 3D location of the actual point $p_{real}$ in the side scattered laser beam 18 relative to the optical sensor 14 geometric origin can now be computed by the following equations:

$$z = (f * b)/(p_1 - p_2) \qquad \text{Eq. (1)}$$

$$x = p_1 * z/f \qquad \text{Eq. (2)}$$

$$y = p_2 * z/f \qquad \text{Eq. (3)}$$

where z, x, and y are coordinates in a 3D coordinate system, f is the focal length of a given sensor, and b is the baseline between the two sensors. Repeat this for any point on the ray in view of the imaging sensors (e.g., cameras) and fit a line (e.g., line 46) to the recovered 3D points. A suitable tool for fitting the line to the recovered 3D points includes, but is not limited to, least squares. This will help filter noise in the measured intensities and provide a vector that defines the direction the platform 12 should travel. The PID controller can be updated on a frame-by-frame basis to account for drift.

Many points along a scattered laser beam look indistinguishable from each other in an image (or image pairs). Once a multi-view camera system is calibrated and rectified such that the epipolar lines are parallel and fall along rows in the digital images the scattered laser correspondence problem simplifies to finding the column location of the maximum scattered energy in each row. Each recovered row, column pair then gives an estimate of a 3D position of a point that falls along the laser beam. These 3D point estimates can be used to find a best fit line using, for example, a least squares algorithm.

Figure 6:
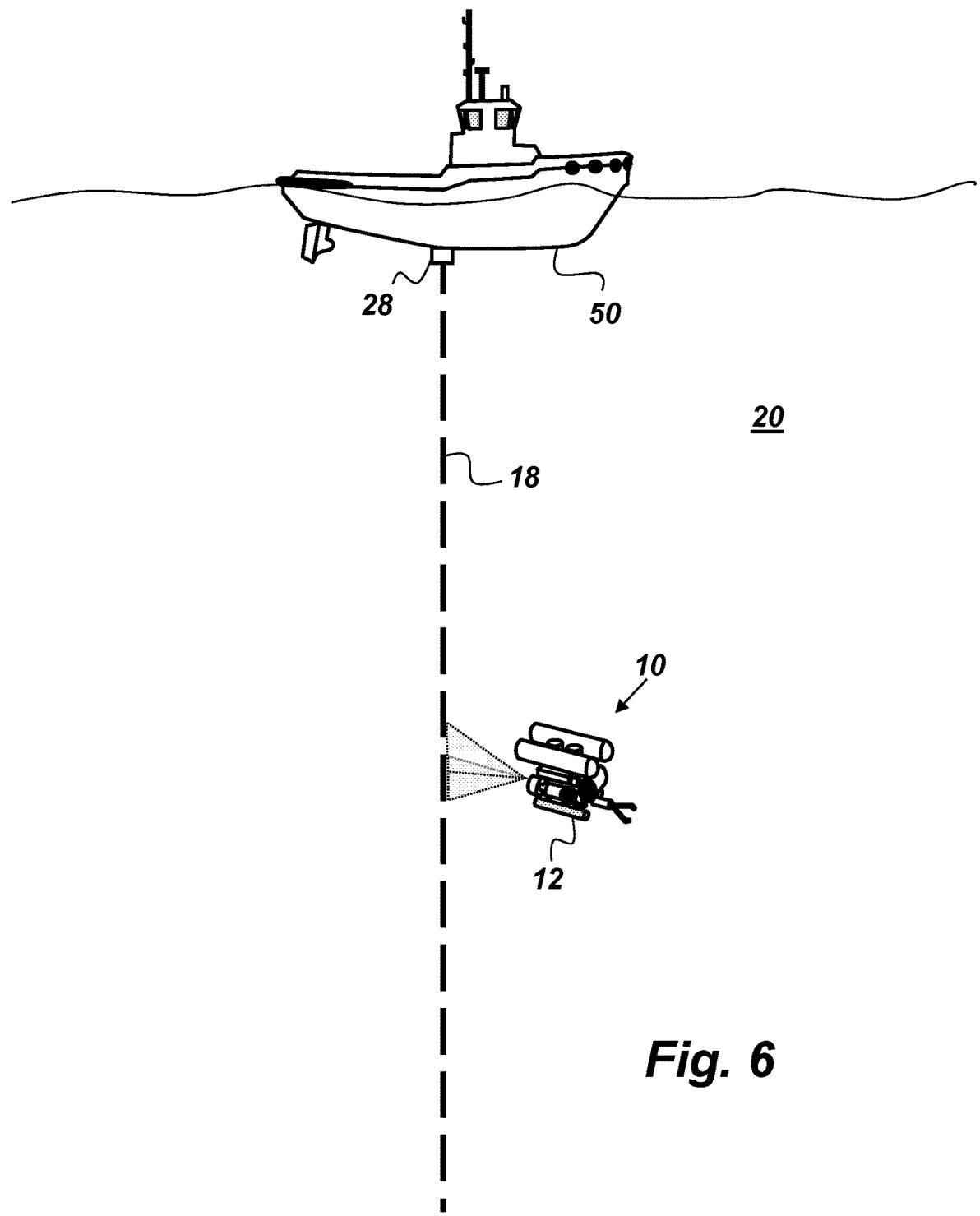
FIG. 6 is an illustration of an embodiment of a light-guided vehicle in an underwater environment.

FIG. 6 is an illustration of an underwater embodiment of the light-guided vehicle 10. In this embodiment the beam source 28 is mounted to a boat 50, the platform 12 is an unmanned underwater vehicle, and the medium 20 is water. The scattering function would be different for this embodiment than the example scattering function for air shown in FIG. 3B, but the fundamental concept/method is unchanged.

From the above description of the light-guided vehicle 10 and method 30, it is manifest that various techniques may be used for implementing the concepts of the light-guided vehicle 10 and method 30 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the light-guided vehicle 10 and method 30 are not limited to the particular embodiments described herein, but are capable of many embodiments without departing from the scope of the claims.

We claim:

1. A method of controlling a vehicle comprising:
propagating a photon beam along a beam propagation path through a medium;
monitoring, with a vehicle-mounted sensor, intensities of off-axis photons that are scattered by aerosol particles in the beam propagation path; and
maintaining the vehicle within a vehicle path based on monitored off-axis-photon intensities, wherein the vehicle path is offset from, and parallel to, the propagation path.

2. The method of claim 1, wherein the medium is air, and further comprising using the vehicle to perform measurements of atmospheric conditions along the beam propagation path.

3. The method of claim 2, wherein the measurements of atmospheric conditions are performed at prescribed distances from a source of the photon beam.

4. The method of claim 2, wherein the propagation path is perpendicular to a surface of the Earth.

5. The method of claim 4, further comprising the step of maintaining the vehicle at a predetermined altitude.

6. The method of claim 5, wherein the maintaining step further comprises measuring a beam waist and maintaining the vehicle at an altitude associated with a predefined beam waist measurement.

7. The method of claim 1, wherein no satellite navigation system is used by the vehicle.

8. The method of claim 7, wherein the vehicle is configured to navigate based solely on monitored off-axis-photon intensities independent of mapping or tomographic data.

9. The method of claim 1, wherein the vehicle comprises:
an optical sensor configured to image off-axis scatter of the photon beam; and
a processing unit capable of inputting and outputting numerical computations.

10. The method of claim 9, wherein the vehicle further comprise an accelerometer and or a gyroscope communicatively coupled to the processing unit.

11. The method of claim 9, wherein the vehicle is a unmanned aerial vehicle (UAV).

12. The method of claim 1, wherein the maintaining step further comprises measuring a beam waist, and wherein the vehicle is configured to operate in one of three modes:
a) move along the vehicle path until a predefined beam waist is measured;
b) return to an origin point; and
c) station keep at a given location along the vehicle path corresponding to a given beam waist measurement.

13. The method of claim 1, wherein the maintaining step further comprises measuring a beam waist, and further comprising the step of configuring the vehicle to return to a point of origin when the beam waist drops below a threshold.

14. The method of claim 1, wherein the vehicle is configured to use a stereoscopic machine vision system to triangulate the photon beam in three dimensions from side-scattered off-axis photons.

15. The method of claim 1, wherein the medium is a liquid.

16. The method of claim 1, wherein the photon beam is a laser.

17. The method of claim 16, wherein the photon beam is a high energy laser.

18. The method of claim 16, wherein the laser emanates from a hand-held laser pointer.

19. A light-guided vehicle comprising:
a platform;
an optical sensor mounted to the platform, wherein the optical sensor is configured to image off-axis scatter of a photon beam;
a processing unit mounted to the platform, wherein the processing unit is communicatively coupled to the platform and to the optical sensor, and wherein the processing unit is configured to monitor intensities of off-axis photons that are scattered by aerosol particles in a beam propagation path as measured by the optical sensor, and wherein the processing unit is further configured to maintain the platform within a vehicle path based on the monitored off-axis-photon intensities, wherein the vehicle path is offset from, and parallel to, the propagation path.

20. The laser-guided vehicle of claim 19, wherein the processing unit is further configured to measure a beam waist of the photon beam.

* * * * *